UNITED STATES PATENT OFFICE.

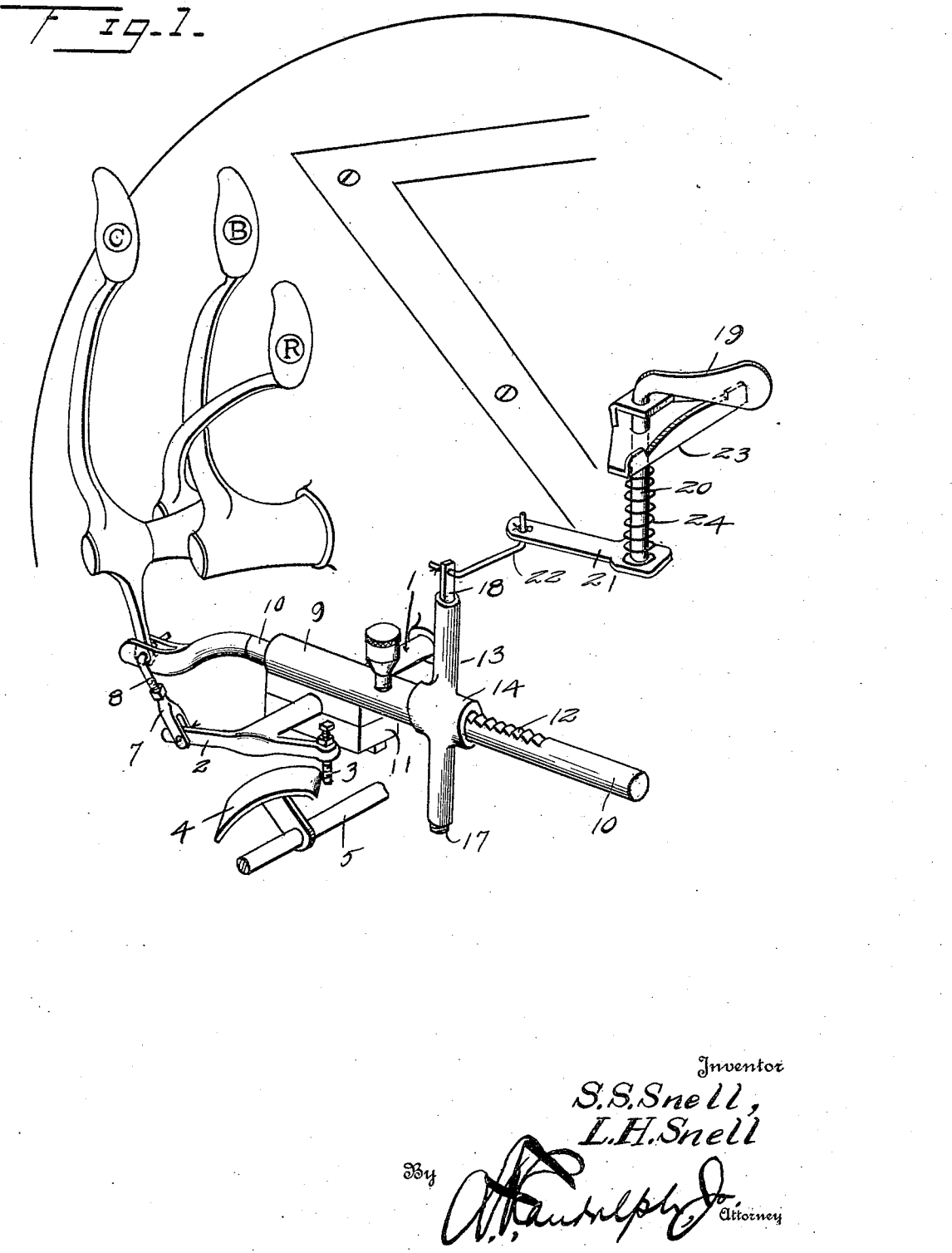

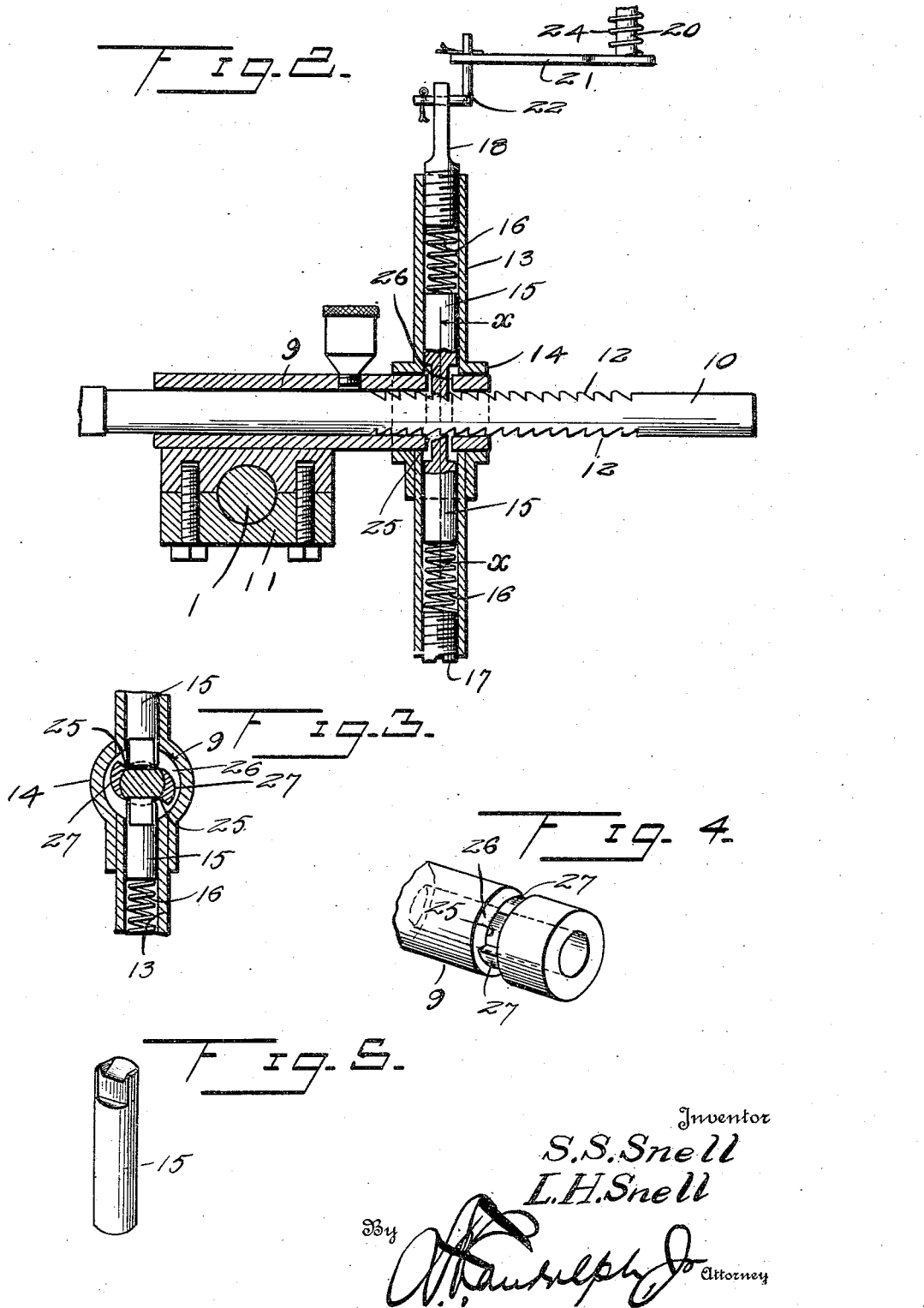

SHERIDAN S. SNELL AND LANCELOT H. SNELL, OF MASONTOWN, PENNSYLVANIA.

DUPLEX SAFETY-CLUTCH CONTROL.

1,421,317.  Specification of Letters Patent. Patented June 27, 1922.

Application filed June 15, 1921. Serial No. 477,757.

*To all whom it may concern:*

Be it known that we, SHERIDAN S. SNELL and LANCELOT H. SNELL, citizens of the United States, residing at Masontown, in the county of Fayette and State of Pennsylvania, have invented certain new and useful Improvements in a Duplex Safety-Clutch Control; and we do hereby declare the following to be a full, clear, and exact description of the invention, such as will enable others skilled in the art to which it appertains to make and use the same.

The invention relates to motor vehicle control associated with the clutch mechanism and is designed chiefly for use in connection with the clutch of a Ford machine, whereby the clutch may be held at any set point, or in slow speed when climbing a hill or negotiating rough, sandy or muddy roads, or in neutral when the car is coasting free from the motor and the emergency brake is released, or when starting the car should the emergency lever accidentally release the control will operate to catch in neutral, or will serve to act as a brake if the pedal is set for slow speed with the motor not running.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a detail view showing the control applied to a Ford machine.

Figure 2 is a sectional detail,

Figure 3 is a transverse section on the line *x—x* of Figure 2.

Figure 4 is a detail perspective view of the guide sleeve in which the rack bar is slidably mounted.

Figure 5 is a detail perspective view of one of the dogs which cooperate with the rack bar.

Corresponding and like parts are referred to in the following description and designated in the several views of the drawings by like reference characters.

Inasmuch as the invention is designed particularly for a Ford machine it is illustrated in connection with the clutch mechanism of this make of machine, although it is to be understood that with slight changes and modifications it may be adapted for cooperation with the clutch mechanism of other makes of machines.

Referring to the drawings, the numeral 1 designates the shaft for operating the clutch the same being provided at its inner end with the usual forks in cooperative relation with the clutch operating collar. The cross bar 2 at the outer end of the shaft 1 is provided at one end with the usual set screw 3 for cooperation with the cam or wiper 4 carried by the shaft 5 to which is attached the emergency brake mechanism and operating lever. These parts are of well known construction and operation in the Ford machine and are illustrated to demonstrate the application of the invention.

The lever 6 for operating the clutch and the slow speed band is connected with the opposite end of the cross bar 2 by means of a clevis 7 and a connection 8, these parts being of ordinary construction and arrangement. A sleeve 9 is mounted upon the shaft 1 and receives a rack bar 10 which is slidable therein. The rack bar 10 is connected with the lever 6 and cross bar 2 by means of the connection 8. the laterally bent end of which passes through the fork at one end of the rack bar 10 laterally offset therefrom and receiving the extension of the lever 6 to which the connection 8 is attached. The sleeve 9 constitutes a guide for the rack bar 10 and is mounted upon the shaft 1 by means of a boxing 11 which loosely receives the shaft 1 and is attached to the sleeve 9 in any preferred way. The rack bar 10 has teeth 12 along opposite sides which are in cooperative relation with the dogs whereby the rack bar may be secured in the desired position to hold the clutch and lever 6 at the required adjusted position.

The rack bar holding means are mounted upon the guide sleeve 9 and comprise essentially a carrier and dog. The carrier consists of a tubular member 13 having a centrally disposed eye 14 which receives an end portion of the guide sleeve 9. A dog 15 is slidably mounted in each end portion of the carrier 13 and its inner end cooperates with a tooth portion 12 of the rack bar 10. An expansible helical spring 16 cooperates with each of the dogs 15 and is retained in place by means of a plug having screw threaded connection with the outer end of the member 13, this plug also provides for adjusting the tension of the spring 16. One of the plugs is designated by the numeral 17 and the other plug by the numeral 18. The plug 18 has an apertured extension which is coupled to a foot lever 19 whereby the rack bar holding means may be thrown into or out of operative position. The foot lever 19 is connected to one end of a shaft 20 from which extends an arm 21 which is adjustably connected by means of a link 22 with the plug 18. An angle plate 23 conveniently mounted on the floor of the machine receives the shaft 20 and its lateral flange cooperates with the lever 19 to hold the same in the required position. An expansible helical spring 24 mounted on the shaft 20 normally exerts a longitudinal pressure thereon to hold the lever 19 in engagement with the lateral flange of the plate 23.

The guide sleeve 9 is provided with an annular groove 26 which receives the inner ends of the dogs 15 whereby the member 13 is retained in position on the sleeve. Lateral openings 25 at diametrically opposite points lead from the annular grooves 26 into the openings of the sleeve 9 and provide for the inner ends of the dogs 15 engaging the toothed portions 12 of the rack bar 10. The bottom of the annular groove 26 at one side of each of the openings 25 is deepened and curved to provide a cam surface 27 which at its inner end merges into the inner wall of the sleeve 9. When the member 13 is rotated on the sleeve 9 the inner ends of the dogs 15 ride on the cam surfaces 27 and are disengaged from the rack bar 10 which is free to move backward and forward in the guide sleeve 9 with the lever 6 or the cross bar 2 according as whichever of these parts is positively actuated. When the holding mechanism is set to admit of the dogs 19 cooperating with the rack bar 10, the member 13 occupies a position on the guide sleeve 9 with the dogs 15 in line with the openings 25 whereby their inner ends are in engagement with the tooth portions 12 of the rack bar. Upon operating either one of the parts 6 or 1 the rack bar coupled thereto moves therewith and slides in the sleeve 9, the dogs 15 riding upon the teeth 12 thereby preventing a reverse movement of the rack bar and holding the parts 6 or 1 in the required adjusted position. The relative position of the member 13 is determined by the lever 19. In one position of the lever 19 the member 13 is in line with the openings 25 and in another extreme position of the lever 19 the member 13 is out of line with the openings 25 and in line with the cam surfaces 27. In the latter position the dogs 15 are clear of the rack bar 10 and the latter is adapted to move freely in the guide sleeve 9. To release the rack bar 10 from the holding means the lever 19 is operated to turn the member 13 from a position in line with the openings 25 to a position in line with the cam surfaces 27. During the movement of the member 13 the pawls 15 ride upon the cam surfaces 27 and clear the rack bar. As indicated most clearly in Figure 2 of the drawings the teeth 12 at one side of the bar 10 alternate with the teeth upon the opposite side of the bar so that when one of the dogs 15 is in engagement with the teeth at one side of the rack bar the dog 15 upon the opposite side of the rack bar occupies a middle position. This provides for a nicety of adjustment. If the teeth are one-eighth of an inch in length the arrangement makes provision for positive engagement of the rack bar at each adjustment of one-sixteenth of an inch within the range of the tooth portions thereof as will be readily understood.

Having thus described the invention, what we claim is:—

1. A safety clutch control comprising a guide, a rack bar slidable in the guide, a member mounted upon and rotatable about the guide and a dog carried by said member and adapted to engage the rack bar when the member is in one position or to clear the rack bar when the member occupies a different position.

2. A safety clutch control comprising a guide, a rack bar slidable in the guide, a member movable on the guide the latter having a cam portion and a dog carried by said member and adapted to engage the rack bar when the member is in one position or to clear the rack bar by riding on the said cam when the member is in a different position.

3. In a safety clutch control, a guide having a lateral opening and a cam at one side of the opening, a rack bar slidable in the guide, a member rotatable on the guide and a dog carried by said member and engageable with the rack bar through the lateral opening of the guide and disengageable from said rack bar by riding upon the said cam.

4. A safety clutch control comprising a guide having a lateral opening and a groove in line with the opening and having a portion of the groove at one side of the lateral opening deepened to provide a cam, a rack bar slidable in the guide, a member rotatable on the guide and a dog carried by the member and in cooperative relation with the rack bar and the lateral opening groove and cam.

5. In a safety clutch control, a guide sleeve mounted upon the clutch operating shaft and having opposed lateral openings and an annular groove in the plane of the lateral openings and deepened to provide cams at one side of the lateral openings, a rack bar slidable in the sleeve and coupled to the clutch operating mechanism, a member rotatable on the guide sleeve, dogs carried by opposite end portions of the rotatable member and in cooperative relation with the rack bar and means for turning the member so as to throw the dogs into or out of operative position.

In testimony whereof we affix our signatures in presence of two witnesses.

SHERIDAN S. SNELL.
LANCELOT H. SNELL.

Witnesses:
 CHAS. H. COX,
 LEWIS HOURASEN.